United States Patent [19]
Trinder

[11] Patent Number: 6,019,010
[45] Date of Patent: Feb. 1, 2000

[54] GEAR-SELECTION MECHANISMS AND A GEARBOX

[75] Inventor: Graham Trinder, Reading, United Kingdom

[73] Assignees: Jeffrey Robert Lucking, Berkshire; Raymond Martin Stokoe, Buckinghamshire, both of United Kingdom

[21] Appl. No.: 09/101,372

[22] PCT Filed: Jan. 10, 1997

[86] PCT No.: PCT/GB97/00097

§ 371 Date: Jul. 8, 1998

§ 102(e) Date: Jul. 8, 1998

[87] PCT Pub. No.: WO97/25558

PCT Pub. Date: Jul. 17, 1997

[30] Foreign Application Priority Data

Jan. 10, 1996 [GB] United Kingdom .................... 9600448
Nov. 25, 1996 [GB] United Kingdom .................... 9624466

[51] Int. Cl.[7] ................ F16H 63/30; F16H 3/08
[52] U.S. Cl. ................ 74/339; 74/325; 74/335; 74/337.5; 192/48.91; 192/93 R
[58] Field of Search ............. 74/325, 339, 333, 74/335, 340, 342, 337.5, 355; 192/48.91, 93 R

[56] References Cited

U.S. PATENT DOCUMENTS 4,757,726  7/1988  Yamaguchi et al. .
4,782,714  11/1988  Schletzbaum et al. .
4,987,790  1/1991  Weismann ........................... 74/337.5 X
5,000,057  3/1991  Tseng ........................................ 74/359
5,018,404  5/1991  Muller .
5,269,194  12/1993  Reynolds ............................. 74/333 X
5,460,060  10/1995  Nellums .
5,462,148  10/1995  Azuma et al. ....................... 74/339 X
5,749,263  5/1998  Buri et al. ............................ 74/331

FOREIGN PATENT DOCUMENTS 0391604A  10/1990  European Pat. Off. .
3711490   10/1987  Germany .
0509317   7/1939   United Kingdom .
1176536   1/1970   United Kingdom .
1594664   8/1981   United Kingdom .

*Primary Examiner*—Dirk Wright
*Assistant Examiner*—Peter T. Kwon
*Attorney, Agent, or Firm*—Davis and Bujold

[57] ABSTRACT

The selector rings (9–11) of a gearbox are moved axially of the mainshaft (8) to engage and disengage gears (1–6) by respective pairs of push-rods (15, 16) which extend inwardly between the gears (1–6). The push-rods (15, 16) bear on oppositely-inclined faces (22) of pairs of blocks (17) which slide in slots (18) parallel to the shaft (8) and which engage respective rings (9–11) at diametrically-opposite locations. Actuation of one pair of rods (15; 16) causes their blocks (17) and the engaged ring (9–11) to move in one direction whereas actuation of the other pair causes movement in the opposite direction. The rods (15, 16) slide within mounting blocks (19) inset between pairs of the gears (1–6), and are actuated by the cam surface (26) of a longitudinally-driven rack (25). Alternatively, the push-rods (47, 48 FIG. 8) are actuated by individual hydraulic rams (45, 46).

15 Claims, 7 Drawing Sheets

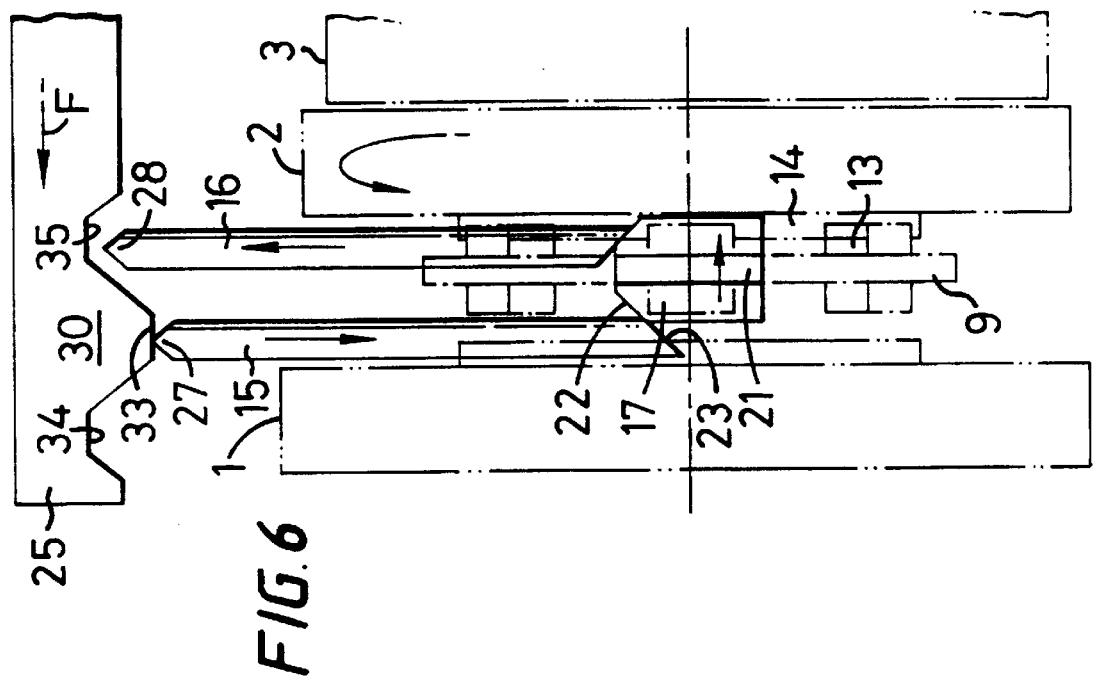
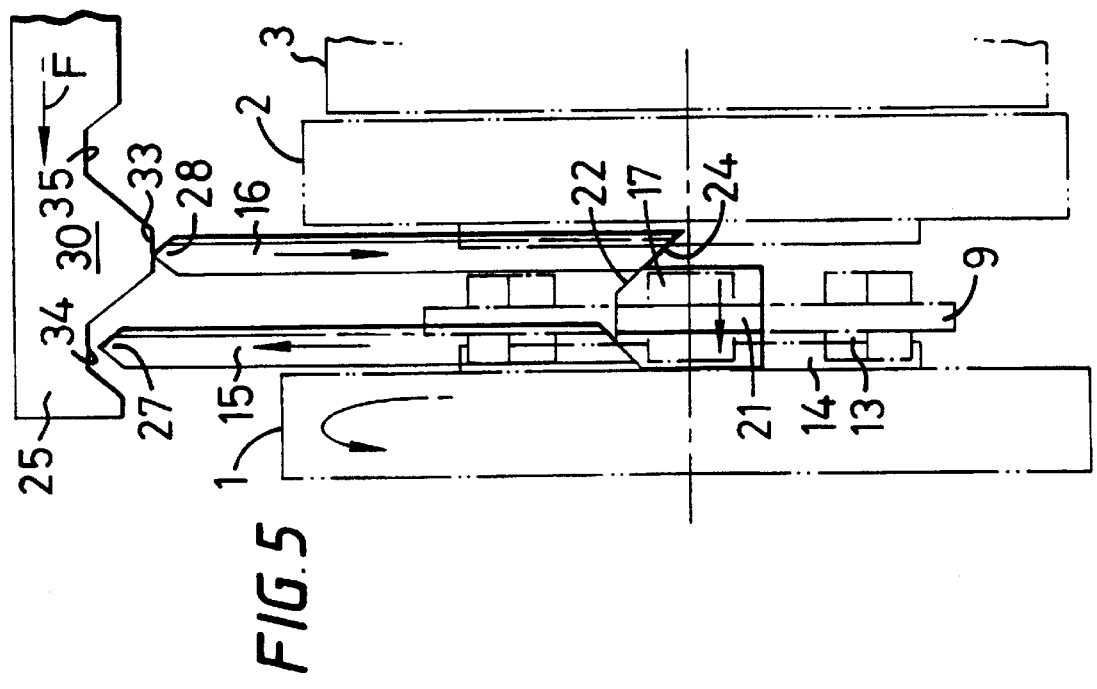

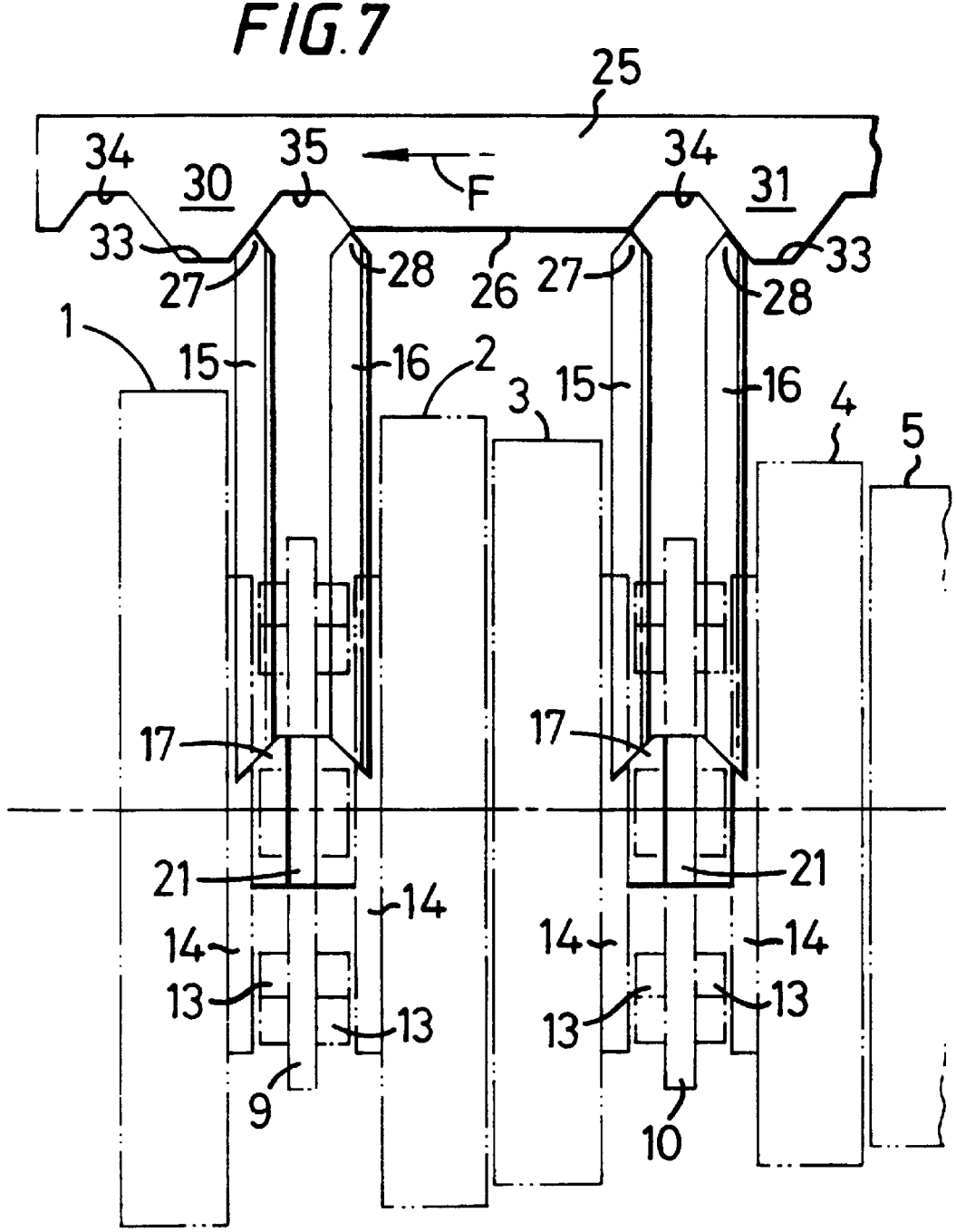

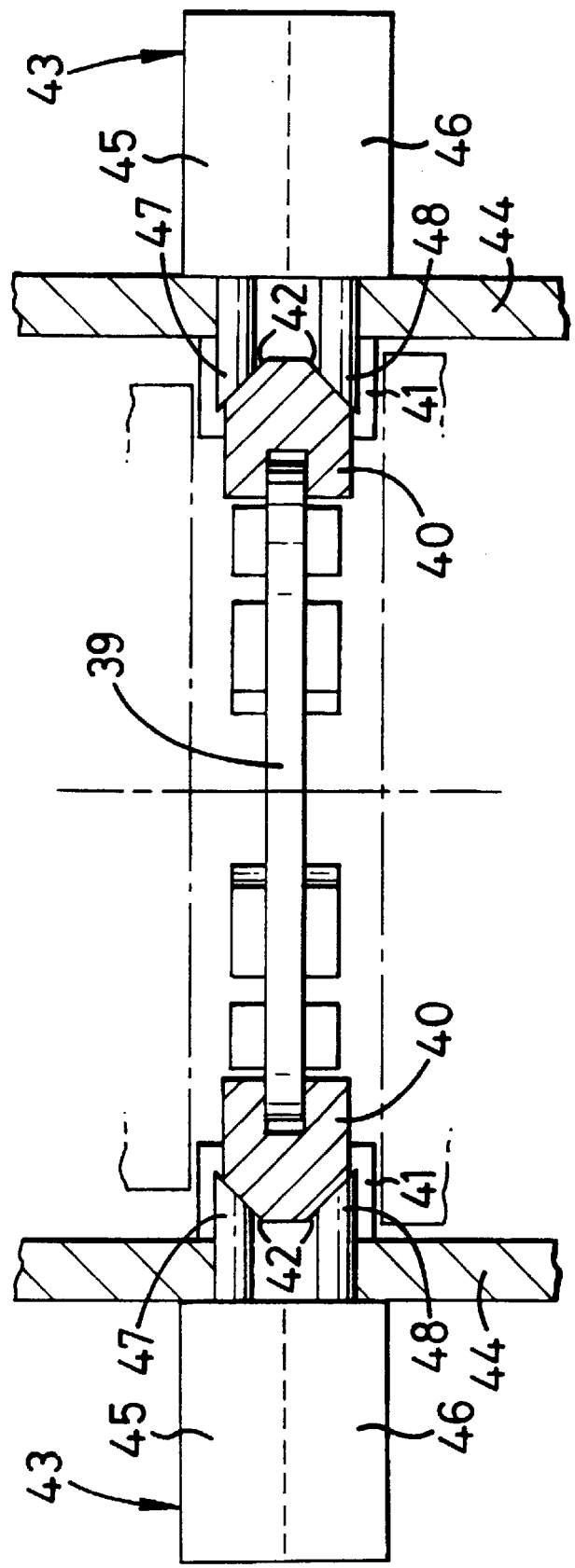

GEAR-SELECTION MECHANISMS AND A GEARBOX

This invention relates to gear-selection mechanisms.

The invention is concerned especially, though not exclusively, with gear-selection mechanisms for motor-vehicle gearboxes.

BACKGROUND OF THE INVENTION

Gear selection in motor-vehicle gearboxes is generally carried out by moving selector rings axially between the gears on the mainshaft of the gearbox (the selector rings may have other than a truly ring configuration, for example that of a sleeve or boss, but the common term "ring" will be used herein). These movements are brought about through selector forks which extend to the selector rings from outside the compass of the gears and which are caused to slide parallel to the mainshaft in dependence upon which of the gears is to be selected. The selector forks draw the selector rings along the mainshaft to engage and disengage the gears, and whereas this known form of selector mechanism, is generally satisfactory, it does have disadvantages, especially in the context of competition motoring, where precision gear-changing is to be achieved.

SUMMARY OF THE INVENTION

It is one of the objects of the present invention to provide a form of gear-selection mechanism that has advantage over the known form referred to above in relation to the achievement of precision gear-changing.

According to the present invention there is provided a gear-selection mechanism in which a selector ring is carried on a shaft for movement axially of the shaft in effecting engagement or disengagement of one or more gears of a gearbox, wherein said movement results from force exerted on the ring from longitudinal displacement of an elongate member that extends transversely with respect to the shaft.

The mechanism of the present invention may include a part which is arranged for movement substantially parallel to the shaft and which engages the ring to move the ring in effecting said engagement or disengagement, and in these circumstances said elongate member may bear upon an inclined surface of this part such that longitudinal displacement of said member moves said part and with it the ring axially of the shaft.

The elongate member may be one of a pair of elongate members which extend transversely with respect to the shaft, longitudinal displacement of the two members of the pair resulting in forces exerted on the ring at substantially diametrically-opposite locations of the ring in the same, one direction substantially parallel to the shaft. In particular, the elongate members may be rods which bear on inclined faces of respective blocks that engage the ring at said locations. Each rod may bear on a first of two oppositely-inclined faces of its respective block, and in this case a second pair of rods may extend transversely with respect to the shaft to bear on the second inclined faces of the respective blocks such that longitudinal displacement of the two rods of the second pair results in forces exerted on the ring at said locations in the direction opposite to said one direction.

According to a feature of the present invention there is provided a gearbox in which selection as between two gears of a pair of gears on a shaft is carried out by selective movement of a selector ring axially of the shaft into engagement with one or the other of the gears in dependence upon the direction of its movement through a neutral position in which it is disengaged from both gears, wherein the axial movement of the selector ring in one direction is carried out by force exerted on the ring from longitudinal displacement of the two rods of a first pair of rods that extend inwardly towards the shaft between the gears, and in the other direction by force exerted on the ring from longitudinal displacement of a second pair of rods that extend inwardly towards the shaft between the gears.

The ring may be engaged at substantially diametrically-opposite locations by two blocks which are arranged to slide substantially parallel to the shaft for moving the ring axially as aforesaid. Each block may have first and second oppositely-inclined faces, and individual rods of the first and second pairs of rods may then bear on the first and second faces respectively, of each block.

The rods may interact with a cam surface of one or more longitudinally-moveable racks such that they are displaced longitudinally in dependence upon longitudinal movement of the one or more racks; the one or more racks may be mounted for longitudinal movement substantially parallel to the shaft. Alternatively, the rods may be displaced longitudinally by individual hydraulic, pneumatic or electric motor means.

BRIEF DESCRIPTION OF THE DRAWINGS

A gearbox incorporating a gear-selection mechanism in accordance with the present invention will now be described, by way of example, with reference to the accompanying drawings, in which:

FIGS. 5 to 7 are illustrative of parts of the gear-selection mechanism of the invention during successive stages of operation from the condition shown in FIG. 4, in engaging and changing gear within the gearbox; and FIG. 8 is a sectional plan view illustrating an alternative form of gear-selection mechanism according to the present invention.

DESCRIPTION OF THE PREFERRED EMBODIMENT(S)

Figure 1:
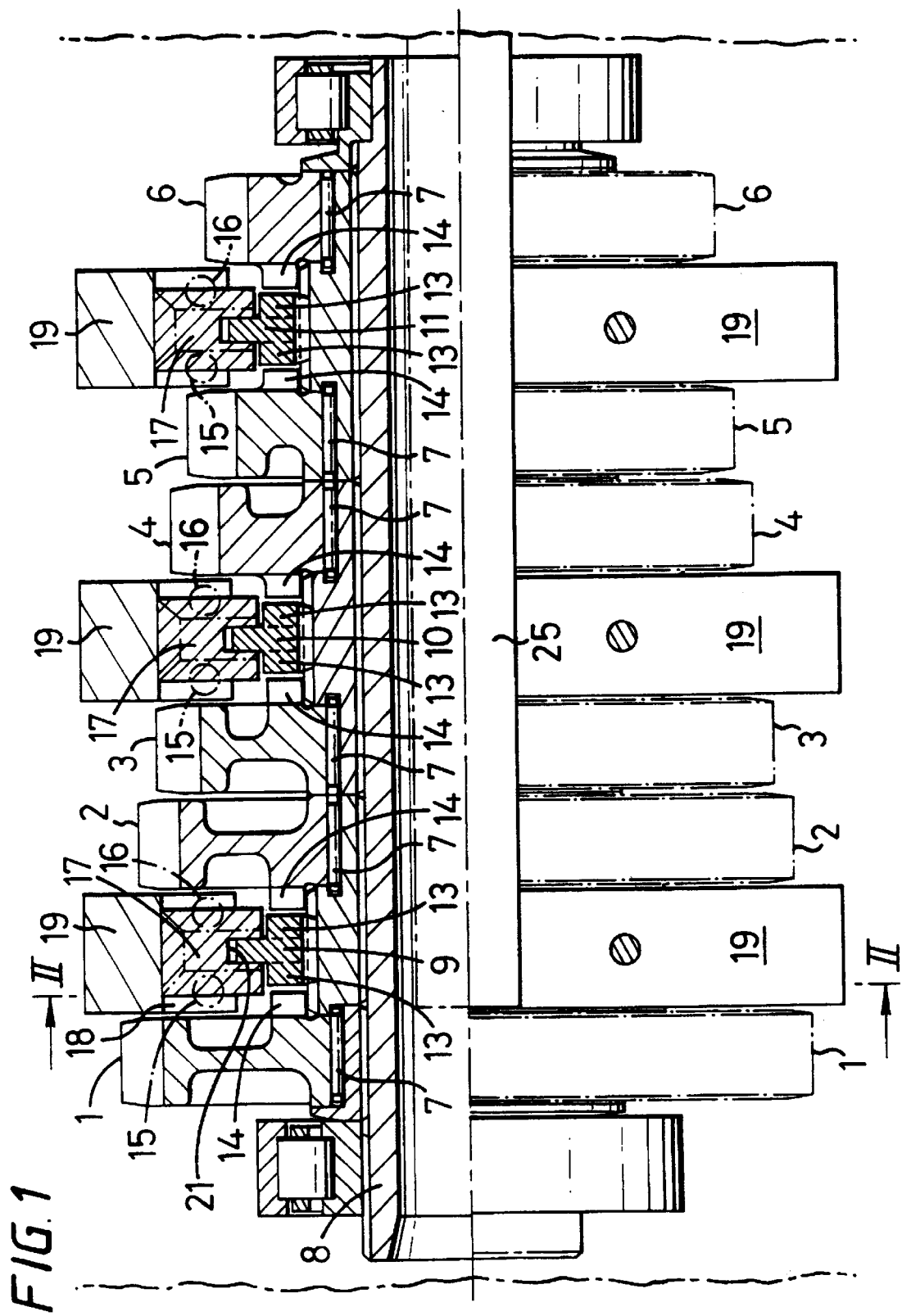
FIG. 1 is a sectional plan of part of the gearbox, showing the mainshaft of the gearbox and the gear-selection mechanism of the present invention.

The gear-selection mechanism of FIG. 1 is for use in the context of a six-gear gearbox for a competition motor-vehicle and in this respect is adapted for gear change up or down through the gears sequentially.

Figure 2:
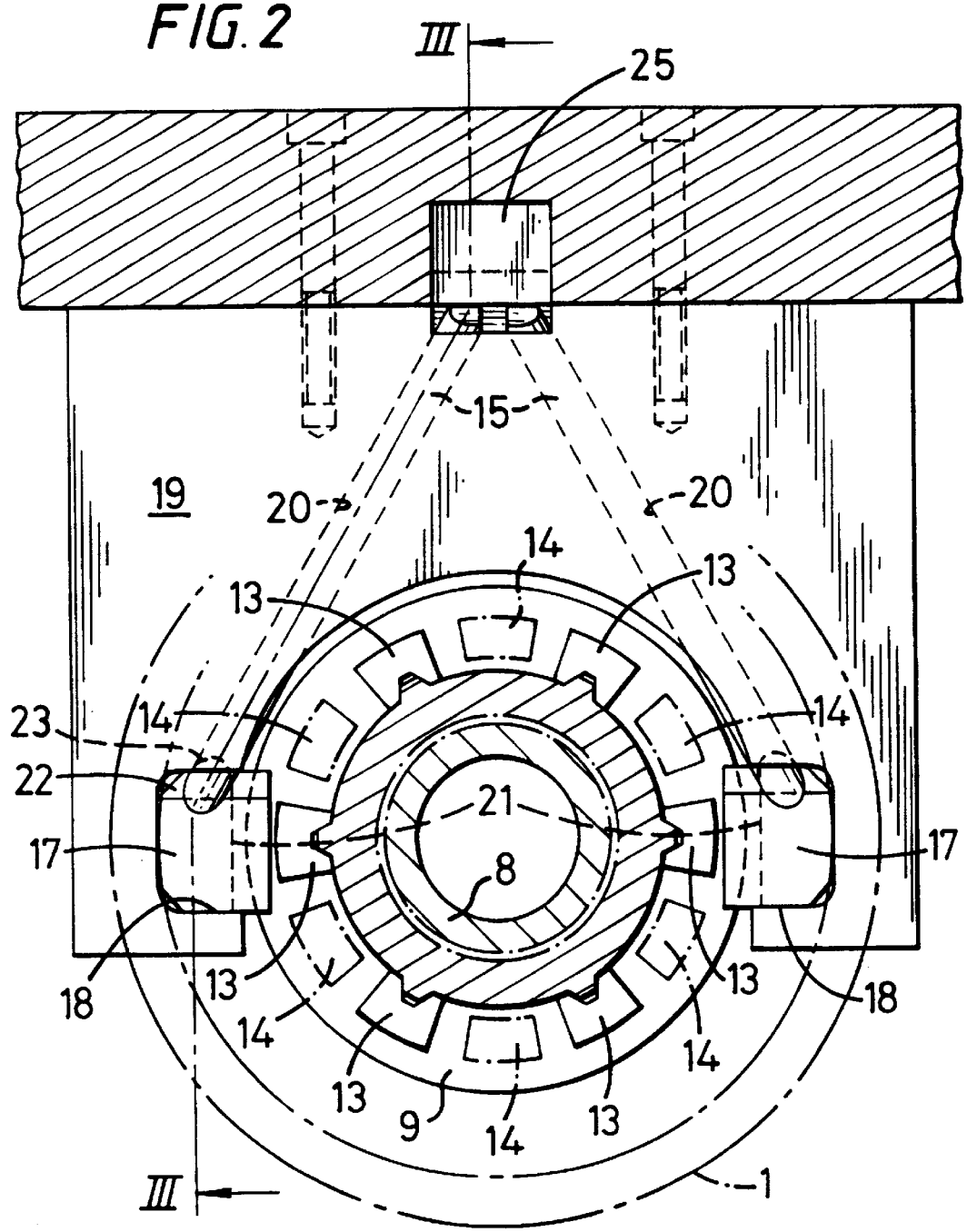
FIG. 2 is an end elevation taken on the line II—II of FIG. 1, showing a dog-ring and other parts of the gear-selection mechanism of the invention.
Figure 3:
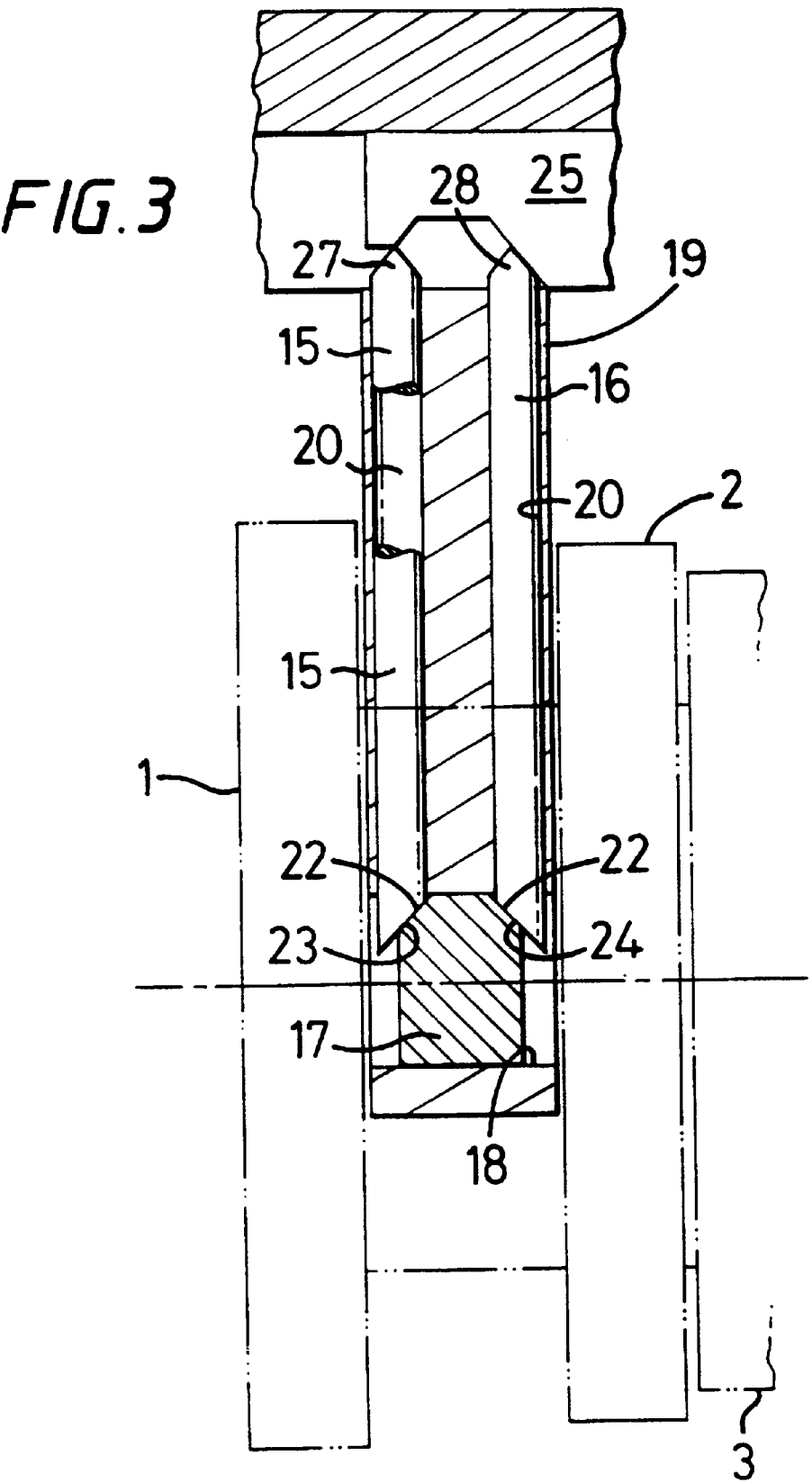
FIG. 3 is a sectional elevation taken on the line III—III of FIG. 2.

Referring to FIGS. 1 and 2, the six drive gears 1 to 6 of the gearbox are rotatably mounted on individual bearings 7 of the mainshaft 8 of the gearbox. Three dog-rings 9 to 11 rotate with the shaft 8 between pairs of the gears 1 to 6, each dog-ring 9 to 11 being carried on an individual axially-splined hub 12 that is mounted on the shaft 8, so as to be moveable in either one direction or the other axially of the shaft 8 for gear-engagement. In the latter regard, the dog-rings 9 to 11 are located between the pairs of gears 1 and 2, 3 and 4, and 5 and 6 respectively, and each has two oppositely-directed sets of dog-teeth 13 for intermeshing with dog-teeth 14 of the drive gears to either side of it. Gears of a layshaft (not shown) mesh with the gears 1 to 6 within the gearbox, and selection of any one of the gears 1 to 6 for engagement in transferring drive from the layshaft to the mainshaft 8, is accordingly made by moving one of the dog-rings 9 to 11 to engage its dog-teeth 13 with the dog-teeth 14 of the relevant gear 1 to 6. The particular dog-ring 9 to 11 moved, and the direction of its axial movement, determine which gear 1 to 6 is selected; disengagement of the gear is brought about by reverse movement of the relevant dog-ring 9 to 11.

To the extent the gear-selection mechanism has so far been described, it is conventional, and the axial movement of the dog-rings 9 to 11 would be achieved according to current practice, using selector forks carried by one or more guide-shafts parallel to the mainshaft 8. In such a mechanism, each fork would extend laterally from its guide-shaft to engage the rim of a respective one of the dog-rings 9 to 11 with a freely-running grasp such that movement of the fork along its guide-shaft moves the dog-ring with it axially of the mainshaft for gear-selection. The guide-shaft would necessarily be spaced laterally from the mainshaft to an extent to clear the gears, and the selector fork as a result of such off-set would be subjected to significant bending forces during engagement and disengagement of its gears. Such forces, not only create undesirable strain in the forks, but affect the precision of the gear-changing process, problems which are particularly manifest in the current generation of competition gearboxes of automatic and semi-automatic kinds. In particular, the forks may readily become bent, or even broken, during use either as a result of imprecision in their set up in the gearbox, or in consequence of jamming of the selector rings on the mainshaft.

The above problems are overcome according to the present invention in the gearbox illustrated in the drawings, by replacing the selector forks with pairs of push-rods 15 and 16. As shown in FIGS. 1 to 4, the push-rods 15 and 16 extend inwardly of the mainshaft 8 to bear on pairs of blocks 17 which slide within guide slots 18 parallel to the mainshaft 8 and which engage the rims of the dog-rings 9 to 11 respectively, with a freely-running grasp. More particularly, and as shown especially in FIGS. 2 and 3 in relation to the dog-ring 9, but typically of the dog-rings 10 and 11 also, a pair of the push-rods 15 are located to the front of the dog-ring 9 and a pair of the push-rods 16 to the rear. In this case, actuation of the pair of push-rods 15 moves the blocks 17 and the dog-ring 9 with it, axially in one direction (specifically, rearwardly), whereas actuation of the pair of push-rods 16 moves the blocks 17 and the dog-ring 9 axially in the opposite (forward) direction.

The two blocks 17 engaged with the dog-ring 9 are retained within the respective slots 18 of a mounting block 19 that is inset within the casing of the gearbox between the gears 1 and 2. The rods 15 and 16 of the dog-ring 9 slide within individual passages 20 which extend slantingly through this block 19 to open into the slots 18. Two passages 20 open side by side into each slot 18, one for a respective rod 15 and the other for a respective rod 16, and the rim of the dog-ring 9 runs within retaining slots 21 of the diametrically-opposed blocks 17 to be moved axially in one direction or the other according to actuation of the pair of push-rods 15 or 16.

Each block 17 associated with the dog-ring 9 has a pair of oppositely-inclined ramp-surfaces 22, and inner chamfered-ends 23 and 24 of the two push-rods 15 and 16 respectively, bear on the ramp-surfaces 22 of the two blocks 17. Accordingly, longitudinal actuation of the two push-rods 15 to urge their ends 23 hard onto respective ramp-surfaces 22 of the blocks 17, gives rise to two axial components of force to move the dog-ring 9 rearwardly along the shaft 1, whereas similar actuation of the two push-rods 16 to urge their ends 24 hard onto the ramp-surfaces 22, gives rise to axial components of force to move the dog-ring 9 in the opposite, forward direction. The components of force in each case are applied to opposite ends of a diameter of the dog-ring 9, minimising the likelihood of the dog-ring 9 jamming on the shaft 8.

Two mounting blocks 19 identical in all respects to the mounting block 19 located between the gears 1 and 2, are inset within the gearbox between the pairs of gears 3 and 4 and gears 5 and 6 respectively, for regulating rearward and forward movements of the respective dog-rings 10 and 11. Thus, movements of the dog-ring 9, and correspondingly of each dog-ring 10 and 11, in both directions for gear-selection (and de-selection) are carried out simply by means of longitudinal, push-movement actuation upon associated pairs of push-rods 15 and 16, without any component of the mechanism being subjected to unsupported bending force.

Actuation of the push-rods 15 and 16 for gear-selection is carried out by means of a longitudinally-displaceable rack 25 which extends parallel to the mainshaft 8 just beyond the compass of the largest-diameter (lowest) gear 1. The rack 25 and its interaction with the push-rods 15 and 16 of the three individual dog-rings 9 to 11 during a sequence of gear-selection will now be described with reference to FIGS. 4 to 7.

Figure 4:
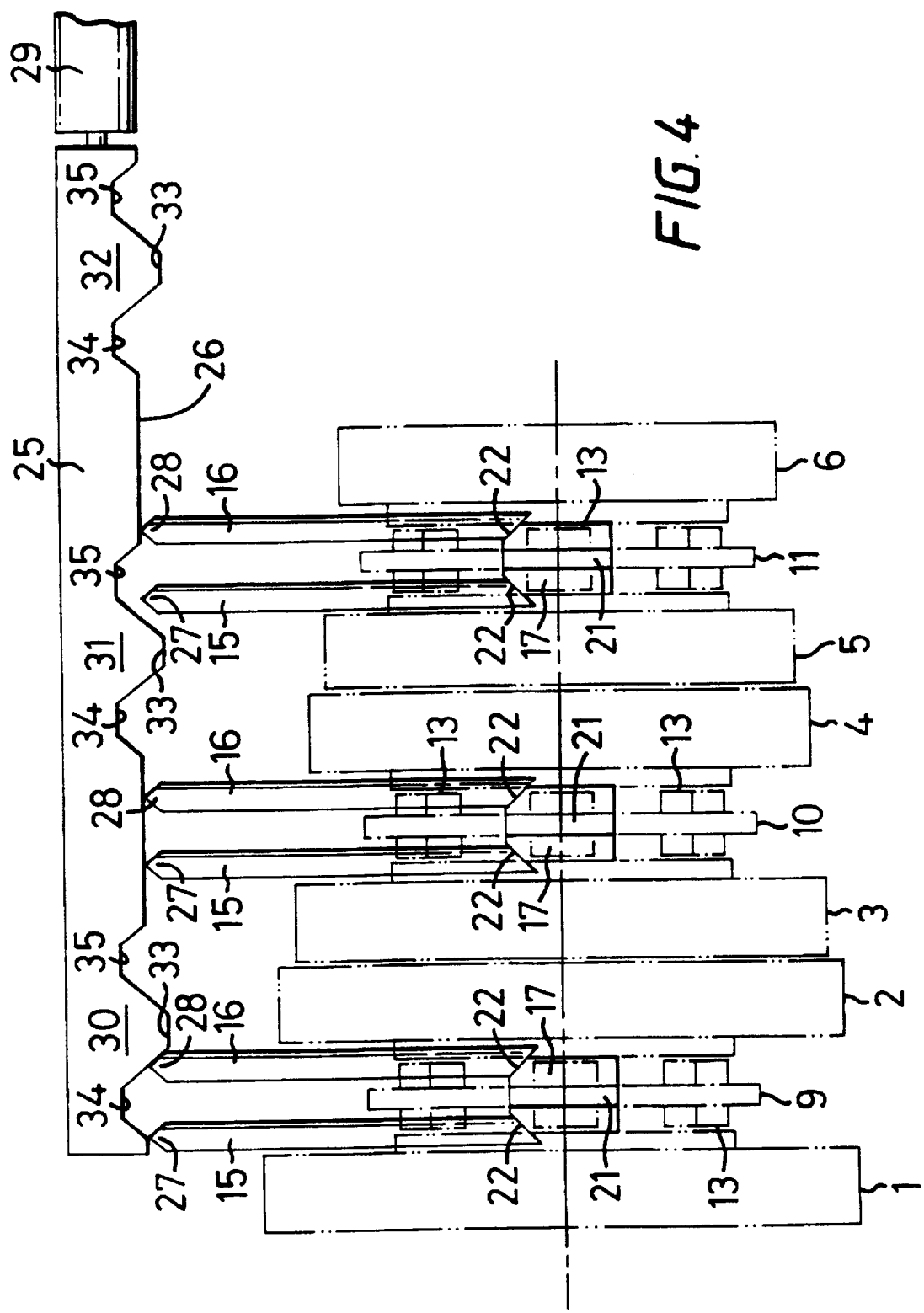
FIG. 4 is illustrative of the gear-selection mechanism of the invention, in side elevation.

Referring to FIG. 4, the rack 25 has a cam surface 26 which is abutted by outer, chamfered ends 27 and 28 of the push-rods 15 and 16 respectively of each dog-ring 9 to 11, as the rack 25 is displaced longitudinally under control of an hydraulic motor 29; the control may alternatively be effected mechanically from a manually-operated gear lever. The cam surface 26 is straight except at three spaced locations 30 to 32 along its length where it is configured with a peak 33 flanked by two notches 34 and 35.

The spacing of the locations 30 to 32 from one another along the rack 25 is chosen to bring about actuation of the push-rods 15 and 16 of the three dog-rings 9 to 11 in turn as the rack 25 is displaced progressively from its initial position under incremental control of the motor 29. The rack 25 is shown in its initial position in FIG. 4, and in this position the gearbox is in neutral with none of the gears 1 to 6 selected.

In order to select the first gear 1, the motor 29 is operated to displace the rack 25 longitudinally by one step. As illustrated in FIG. 5, this movement of the rack 25, in the direction of the arrow F, brings about change in the condition between the gears 1 and 2. More particularly, in reaching the changed condition, the peak 33 at the location 30 of the rack 25 pushes the pair of push-rods 16 of the dog-ring 9 hard down onto their respective blocks 17. This causes the dog-ring 9 to move forwards axially to engage the first gear 1. The push-rods 15 of the dog-ring 9 are pushed upwardly by the blocks 17 into the notch 34 of location 30 by this movement, so offer no resistance or obstruction to this gear-engaging movement of the dog-ring 9. The push-rods 15 and 16 of the other dog-rings 10 and 11 are not affected by this initial displacement of the rack 25, so the dog-rings 10 and 11 remain in their neutral positions.

Operation of the motor 29 again, to displace the rack 25 by another step in the direction of the arrow F from the condition shown in FIG. 5 to the condition shown in FIG. 6, brings the peak 33 at location 30 onto the push-rods 15 of the dog-ring 9. Initially during this step, the push-rods 15 of the dog-ring 9 are pushed down out of the flanking notch 34 at the location 30, so that the dog-ring 9 is moved rearwardly to disengage from the first gear 1. This rearward movement of the dog-ring 9 is then continued through during the remainder of the step to engage the second gear 2 as the push-rods 15 continue to be urged down further by the peak 33 at location 30. The push-rods 16 of the dog-ring 9 are pushed upwardly by the blocks 17 into the flanking notch 35 at location 30, so offer no resistance or obstruction to this gear-engaging movement. Here again, the dog-rings 10 and 11 are not affected and remain in their neutral positions.

Further incremental operation of the motor 29 displaces the rack 25 by a third step in the direction of the arrow F from the condition shown in FIG. 6, to disengage the second gear 2 and engage the third gear 3. In this regard, FIG. 7 shows the intermediate condition during this step in which the second gear 2 has been disengaged by the pushing down of the rods 16 as they are urged out of the notch 35 at the location 30, and the push-rods 16 of the dog-ring 10 are about to be pushed down by the peak 33 at location 31, to bring about engagement of the third gear 3.

Continued incremental operation of the motor 29 to displace the rack 25 a fourth step in the direction of the arrow F from the condition with the third gear 3 engaged, thus acts firstly through engagement of the push-rods 15 and 16 of the dog-ring 10 with the peak 33 and notch 35 at location 31 to disengage the third gear 3 and engage the fourth gear 4. From this condition further operation of the motor 29 to displace the rack 25 on in turn through fifth and sixth steps in the direction of the arrow F, brings about change up to the fifth gear 5 and then to the sixth gear 6, as the push-rods 15 and 16 follow the cam surface 26 at locations 31 and 32.

Reversal of the direction of the incremental drive to the rack 25, steps the mechanism back through the sequential gear-selection process from the condition with the sixth gear 6 engaged, to return to the neutral condition of FIG. 4.

The push-rods 15 and 16 are biased resiliently to hold their neutral positions and the positions to which they are displaced during operation, by spring-loaded plungers or balls that cooperate with dimples or slots in the rods 15 and 16. Similarly, spring-loaded plungers or balls are provided to latch the rack 25 to its step positions for precision of gear-selection. These details are omitted from the drawings.

Although the invention has been described above in the context of sequential selection of gears as used in competition motor-vehicles, it is not limited to this. In this respect, it will be apparent that by suitable operation of the motor 29, the rack 25 can be driven appropriately to enable change up or down, from whichever of the gears 1 to 6 is selected. Also, use of the rack 25 for mechanical actuation of the push-rods 15 and 16 in pairs is not essential since two intercoupled racks similar to the rack 25 may be used in parallel with one another, one to actuate the rods 15 and 16 to one side of the shaft 8 and the other to operate the rods 15 and 16 to the other side; this enables the rods 15 and 16 to be generally shorter and at right angles, rather than slanted, to the axial plane containing the blocks 17.

However, rather than having one or two racks to operate the three dog-rings 9 to 11 in common, they may be individually actuated. Moreover, in the latter respect, pairs of push-rods for each dog-ring 9 to 11 may be operated by individual electrical, pneumatic or hydraulic motors. An example of operation by means of hydraulic motors or rams is illustrated in FIG. 8, in the case of a typical dog-ring, and will now be described.

Referring to FIG. 8, the rim of the dog-ring 39 in this case runs freely through two slotted blocks 40 that slide within diametrically-opposed slots 41. Each block 40 has a pair of oppositely-inclined ramp-surfaces 42, and its sliding movement in either axial direction within the slots 41 is regulated by two hydraulic units 43 that are mounted diametrically opposite one another externally of the gearbox casing-wall 44.

Each unit 43 includes two hydraulic rams 45 and 46 that have piston rods 47 and 48 which extend through the casing-wall 44 to bear on the ramp-surfaces 42 of an individual one of the slide-blocks 40. Movement of the dog-ring 39 in one direction is thus brought about by operation of the rams 45 of the two units 43 to force the rods 47 hard onto the blocks 40. Operation of the rams 46, on the other hand, forces the rods 48 hard onto the blocks 40 to move them, and with them the dog-ring 39, in the opposite axial direction.

Although the invention is described above in the context of a gearbox without synchromesh, the invention is not limited in this regard and may be applied where synchromesh is provided. It is applicable also where operation is manual, automatic or semi-automatic.

I claim:

1. A gear-selection mechanism in which a selector ring is carried on a shaft for movement axially of the shaft in effecting engagement or disengagement of one or more gears of a gearbox, wherein said movement results from force exerted on the ring from longitudinal displacement of an elongate member that extends transversely with respect to the shaft.

2. A gear-selection mechanism according to claim 1 wherein a part which is arranged for movement substantially parallel to the shaft engages the ring to move the ring in effecting said engagement or disengagement, and said elongate member bears upon an inclined surface of said part such that longitudinal displacement of said member moves said part and with it the ring axially of the shaft.

3. A gear-selection mechanism according to claim 1 wherein said elongate member is one of a pair of elongate members which extend transversely with respect to the shaft, longitudinal displacement of the two members of the pair resulting in forces exerted on the ring at substantially diametrically-opposite locations of the ring in the same, one direction substantially parallel to the shaft.

4. A gear-selection mechanism according to claim 3 wherein the elongate members are rods which bear on inclined faces of respective blocks that engage the ring at said locations.

5. A gear-selection mechanism according to claim 4 wherein each rod bears on a first of two oppositely-inclined faces of its respective block, and a second pair of rods extend transversely with respect to the shaft to bear on the second inclined faces of the respective blocks such that longitudinal displacement of the two rods of the second pair results in forces exerted on the ring at said locations in the direction opposite to said one direction.

6. A gear-selection mechanism according to claim 4 wherein the blocks slide within respective slots of mounting means that is adapted to be inset between gears of the gearbox, and the rods slide within passages that open into these slots.

7. A gear-selection mechanism according to claim 4 wherein the rods interact with a cam surface such that they are displaced longitudinally in dependence upon movement of the cam surface.

8. A gear-selection mechanism according to claim 4 wherein the rods are displaced longitudinally by hydraulic, pneumatic or electric motor means.

9. A gearbox in which selection as between two gears of a pair of gears on a shaft is carried out by selective movement of a selector ring axially of the shaft into engagement with one or the other of the gears in dependence upon the direction of its movement through a neutral position in which it is disengaged from both gears, wherein the axial movement of the selector ring in one direction is carried out by force exerted on the ring from longitudinal displacement of the two rods of a first pair of rods that extend inwardly towards the shaft between the gears, and in the other direction by force exerted on the ring from longitudinal displacement of a second pair of rods that extend inwardly towards the shaft between the gears.

10. A gearbox according to claim 9 wherein the ring is engaged at substantially diametrically-opposite locations by two blocks which are arranged to slide substantially parallel to the shaft for moving the ring axially as aforesaid, each block has first and second oppositely-inclined faces, and individual rods of the first and second pairs of rods bear on the first and second faces respectively, of each block.

11. A gearbox according to claim 9 wherein the rods interact with a cam surface of one or more longitudinally-moveable racks such they are displaced longitudinally in dependence upon longitudinal movement of the one or more racks.

12. A gearbox according to claim 11 wherein the one or more racks are mounted for longitudinal movement substantially parallel to the shaft.

13. A gearbox according to claim 9 wherein the rods are displaced longitudinally by individual hydraulic, pneumatic or electric motor means.

14. A gearbox according to claim 9 wherein selection as between the two gears of a plurality of pairs of gears on the shaft is carried out in each case by selective movement of an individual selector ring axially of the shaft in either of two directions, and wherein the axial movement of the respective selector ring in one of the directions is carried out by force exerted on that ring from longitudinal displacement of a first pair of rods individual to that ring, and in the other of the directions by force exerted on the respective ring from longitudinal displacement of a second pair of rods individual to the ring.

15. A gearbox comprising: drive-input means; drive-output means; a gear train defining a transmission path of selectively-variable gear ratio for conveying drive from the input means to the output means, said gear train including a shaft and at least one gear mounted on said shaft; and a selectively-operable gear-selection mechanism for engaging said one gear in the transmission path, the gear-selection mechanism comprising a selector ring mounted on said shaft for movement axially of the shaft to effect engagement of said one gear in the transmission path, a member mounted for displacement transversely with respect to the shaft, and selectively-operable means for displacing said member transversely with respect to the shaft to exert force on the ring moving it axially of the shaft as aforesaid.

* * * * *